United States Patent
Homma

(10) Patent No.: US 8,197,985 B2
(45) Date of Patent: Jun. 12, 2012

(54) FUEL CELL SYSTEM WITH LOAD APPLYING MECHANISM

(75) Inventor: Hiroki Homma, Asaka (JP)

(73) Assignee: Honda Motor Co., Ltd., Tokyo (JP)

( * ) Notice: Subject to any disclaimer, the term of this patent is extended or adjusted under 35 U.S.C. 154(b) by 1208 days.

(21) Appl. No.: 11/793,869

(22) PCT Filed: Dec. 22, 2005

(86) PCT No.: PCT/JP2005/024175
§ 371 (c)(1),
(2), (4) Date: Jun. 21, 2007

(87) PCT Pub. No.: WO2006/068316
PCT Pub. Date: Jun. 29, 2006

(65) Prior Publication Data
US 2008/0008917 A1    Jan. 10, 2008

(30) Foreign Application Priority Data
Dec. 22, 2004    (JP) .................................. 2004-370845

(51) Int. Cl.
H01M 2/10    (2006.01)
H01M 8/24    (2006.01)
(52) U.S. Cl. ......................... 429/511; 429/507; 429/466
(58) Field of Classification Search .......... 429/507–508, 429/511
See application file for complete search history.

(56) References Cited

U.S. PATENT DOCUMENTS

| | | | | |
|---|---|---|---|---|
| 4,849,308 A | * | 7/1989 | Schmitten et al. | 429/460 |
| 5,595,834 A | * | 1/1997 | Wilson et al. | 429/457 |
| 5,851,689 A | | 12/1998 | Chen | |
| 5,998,053 A | | 12/1999 | Diethelm | |
| 6,033,793 A | * | 3/2000 | Woods et al. | 429/410 |
| 6,042,956 A | | 3/2000 | Lenel | |
| 2003/0072979 A1 | * | 4/2003 | Hill et al. | 429/13 |
| 2006/0134499 A1 | | 6/2006 | Homma | |

FOREIGN PATENT DOCUMENTS

| | | |
|---|---|---|
| DE | 19506690 | 8/1996 |
| JP | 60-205972 | 10/1985 |
| JP | 61-058176 | 3/1986 |

(Continued)

OTHER PUBLICATIONS

Japanese Office Action for Application No. 2004-370845, dated Nov. 17, 2009.

Primary Examiner — Barbara Gilliam
Assistant Examiner — Maria J Laios
(74) Attorney, Agent, or Firm — Nelson Mullins Riley & Scarborough LLP; Anthony A. Laurentano

(57) ABSTRACT

A fuel cell system includes a fuel cell stack, a fluid unit, a load applying mechanism, and a casing. The casing contains the fuel cell stack, the fluid unit, and the load applying mechanism. A heat insulating member is provided between the fuel cell stack and the load applying mechanism. The heat insulating member limits heat transmission from the fuel cell stack to the load applying mechanism. The load applying mechanism includes metal springs for applying a load to the fuel cell stack in a stacking direction of the fuel cell stack.

6 Claims, 9 Drawing Sheets

FOREIGN PATENT DOCUMENTS

| | | |
|---|---|---|
| JP | 64-3971 | 1/1989 |
| JP | 05-290868 | 11/1993 |
| JP | 08-045535 | 2/1996 |
| JP | 10-032016 | 2/1998 |
| JP | 10-55815 | 2/1998 |
| JP | 10-64568 | 3/1998 |
| JP | 2001-52726 | 2/2001 |
| JP | 2001-093564 | 4/2001 |
| JP | 2002-302785 | 10/2002 |
| JP | 2005-190867 | 7/2005 |
| JP | 2006-179283 | 7/2006 |
| WO | WO-2004-077587 | 9/2004 |

* cited by examiner

Prior Art

FUEL CELL SYSTEM WITH LOAD APPLYING MECHANISM

RELATED APPLICATIONS

This application is a 35 U.S.C. 371 national stage filing of International Application No. PCT/JP2005/024175 filed 22 Dec. 2005, which claims priority to Japan Patent Application No. 2004-370845 filed on 22 Dec. 2004 in Japan. The contents of the aforementioned applications are hereby incorporated by reference.

TECHNICAL FIELD

The present invention relates to a fuel cell system including a fuel cell stack, a fluid unit, and a load applying mechanism provided in a casing.

BACKGROUND ART

Typically, a solid oxide fuel cell (SOFC) employs an electrolyte of ion-conductive solid oxide such as stabilized zirconia. The electrolyte is interposed between an anode and a cathode to form an electrolyte electrode assembly (unit cell). The electrolyte electrode assembly is interposed between separators (bipolar plates). In use, a predetermined number of the unit cells and the separators are stacked together to form a fuel cell stack.

In the fuel cell, an oxygen-containing gas or the air is supplied to the cathode. The oxygen in the oxygen-containing gas is ionized at the interface between the cathode and the electrolyte, and the oxygen ions ($O^{2-}$) move toward the anode through the electrolyte. A fuel gas such as a hydrogen-containing gas or CO is supplied to the anode. Oxygen ions react with the hydrogen in the hydrogen-containing gas to produce water or react with CO to produce $CO_2$. Electrons released in the reaction flow through an external circuit to the cathode, creating a DC electric energy.

For example, a fuel cell tightening apparatus disclosed in Japanese Laid-Open Patent Publication No. 8-45535 is known. The fuel cell tightening apparatus is used at the time of stacking fuel cells to form a stack. As shown in FIG. 9, in the fuel cell tightening apparatus, two pairs of fuel cell stacks 3 are provided between upper and lower bolsters 1a, 1b, using an upper holder 2a, an intermediate holder 2b, and a lower holder 2c. A lower heat insulating block 4a is interposed between the lower holder 2c and the lower bolster 1b. An upper heat insulating block 4b, a plurality of springs 5, and bellows 6 are interposed between the upper holder 2a and the upper bolster 1a. Components between the upper and lower bolsters 1a, 1b are tightened together by tightening rods 7 and nuts 8.

According to the disclosure, with the above-described structure, it is possible to suppress variation of the tightening load due to the change in the spring constant or the decrease of the spring reaction force at high temperature as in the case of using only the springs 5, and it is possible to maintain the tightening load at a certain level by the springs 5 and the bellows 6.

However, in the conventional technique, since the springs 5 and the bellows 6 are used as a load mechanism, the structure of the load mechanism is complicated uneconomically. Further, the springs 5 are exposed to the high temperature environment during operation of the fuel cells. Therefore, the springs 5 are deteriorated easily.

DISCLOSURE OF INVENTION

A main object of the present invention is to provide a fuel cell system having a simple and economical structure in which it is possible to effectively improve durability of a load applying mechanism for applying a tightening load to a fuel cell stack.

The present invention relates to a fuel cell system comprising a fuel cell stack, a fluid unit, a load applying mechanism, and a casing. The fuel cell stack is formed by stacking a plurality of fuel cells in a stacking direction. Each of the fuel cells includes an electrolyte electrode assembly and separators sandwiching the electrolyte electrode assembly. The electrolyte electrode assembly includes an anode, a cathode, and an electrolyte interposed between the anode and the cathode. The fluid unit is provided on one side of the fuel cell stack. The fluid unit includes a heat exchanger for heating an oxygen-containing gas to be supplied to the fuel cell stack, and a reformer for reforming a fuel to produce a fuel gas. The load applying mechanism is provided on the other side of the fuel cell stack for applying a tightening load to the fuel cell stack in the stacking direction. The casing contains the fuel cell stack, the fluid unit, and the load applying mechanism.

A heat barrier layer is provided between the fuel cell stack and the load applying mechanism for limiting heat transmission from the fuel cell stack to the load applying mechanism. The load applying mechanism includes a metal elastic member for applying the load to the fuel cell stack in the stacking direction.

Further, it is preferable that the load applying mechanism includes a first tightening unit for applying a load to a predetermined seal region of the fuel cell stack in the stacking direction and a second tightening unit for applying a load to the electrolyte electrode assembly in the stacking direction through only the metal elastic member, and the load applied by the second tightening unit is smaller than the load applied by the first tightening unit.

Further, it is preferable that the casing includes a first case unit containing the load applying mechanism and a second case unit containing the fuel cell stack and the fluid unit, and heat insulating material as the heat barrier layer is interposed between the first case unit and the second unit.

Further, it is preferable that a coolant inlet for allowing entry of a coolant for cooling the metal elastic member is formed in the first case unit.

BEST MODE FOR CARRYING OUT THE INVENTION

Figure 1:
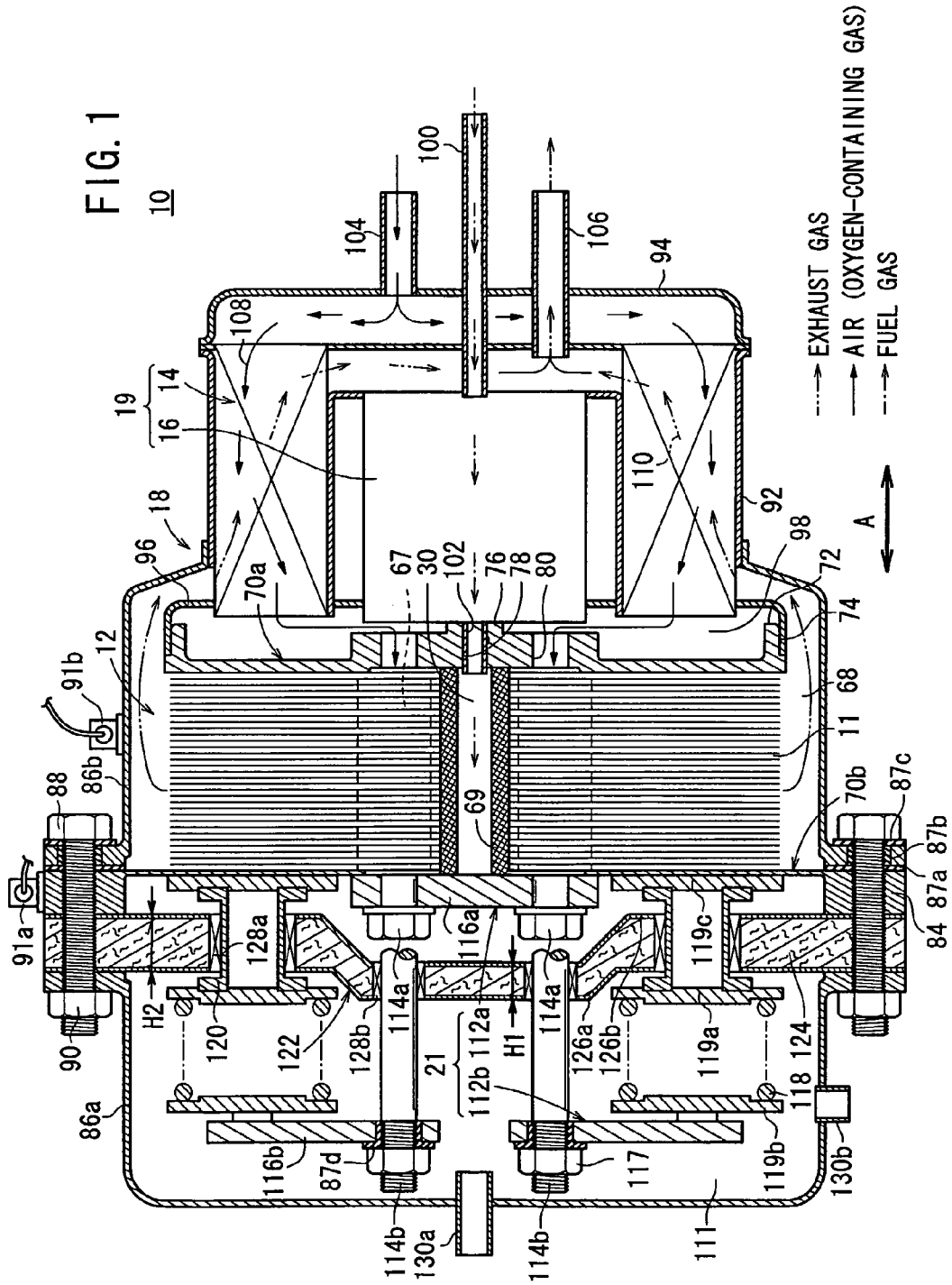
FIG. 1 is a partial cross sectional view showing a fuel cell system according to an embodiment of the present invention.
Figure 2:
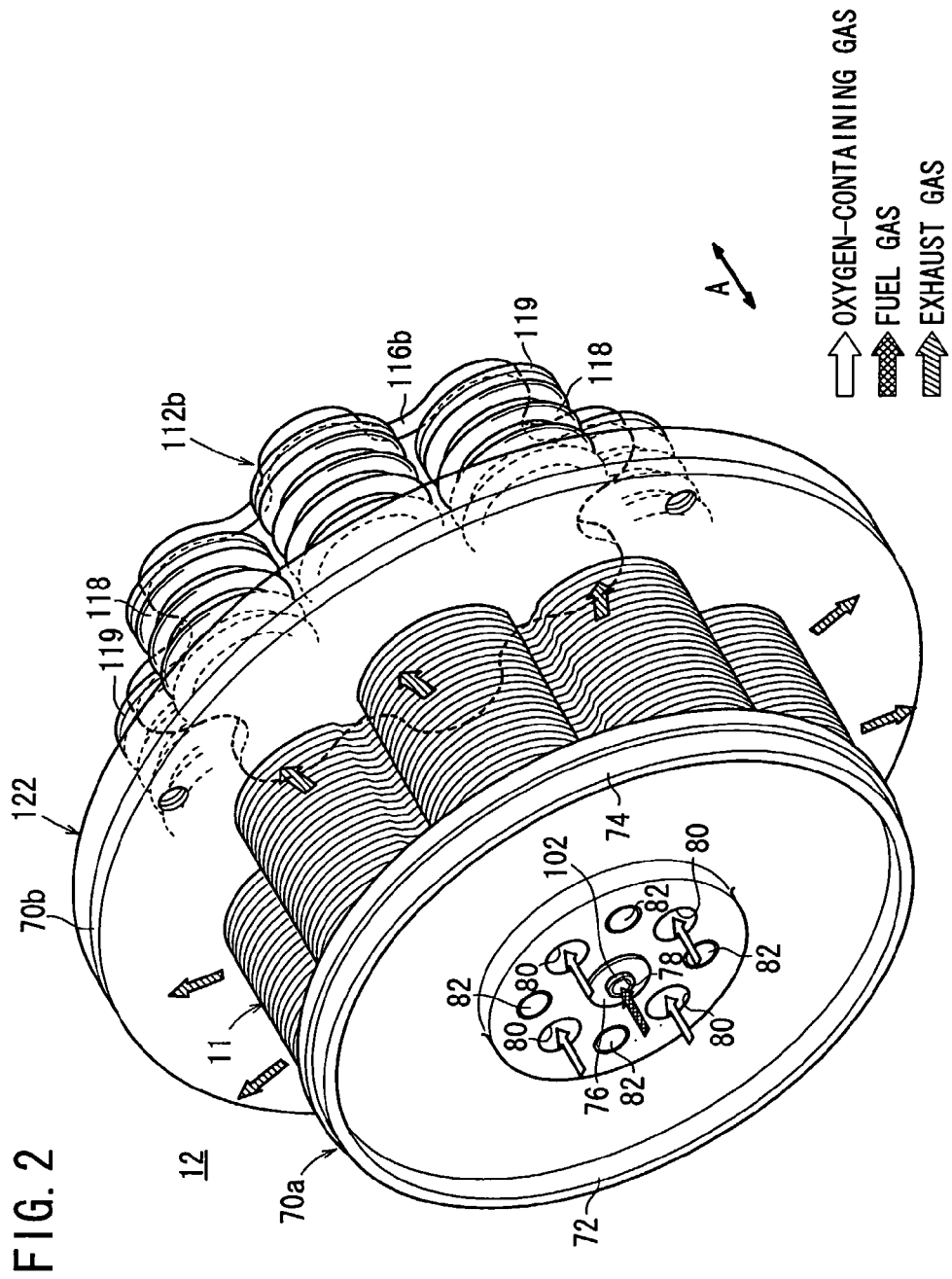
FIG. 2 is a perspective view schematically showing a fuel cell stack of the fuel cell system.

FIG. 1 is a partial cross sectional view showing a fuel cell system 10 according to an embodiment of the present invention. FIG. 2 is a perspective view schematically showing a fuel cell stack 12 of the fuel cell system 10. The fuel cell stack 12 is formed by stacking a plurality of fuel cells 11 in a direction indicated by an arrow A.

The fuel cell system 10 is used in various applications, including stationary and mobile applications. For example, the fuel cell system 10 is mounted on a vehicle. As shown in FIG. 1, the fuel cell system 10 includes the fuel cell stack 12, a heat exchanger 14, a reformer 16, and a casing 18. The heat exchanger 14 heats the oxygen-containing gas before it is supplied to the fuel cell stack 12. The reformer 16 reforms a fuel to produce a fuel gas. The fuel cell stack 12, the heat exchanger 14, and the reformer 16 are disposed in the casing 18.

In the casing 18, a fluid unit 19 including at least the heat exchanger 14 and the reformer 16 is disposed on one side of the fuel cell stack 12, and a load applying mechanism 21 for applying a tightening load to the fuel cells 11 in the stacking direction indicated by the arrow A is disposed on the other side of the fuel cell stack 12. The fluid unit 19 and the load applying mechanism 21 are provided symmetrically with respect to the central axis of the fuel cell stack 12.

Figure 3:
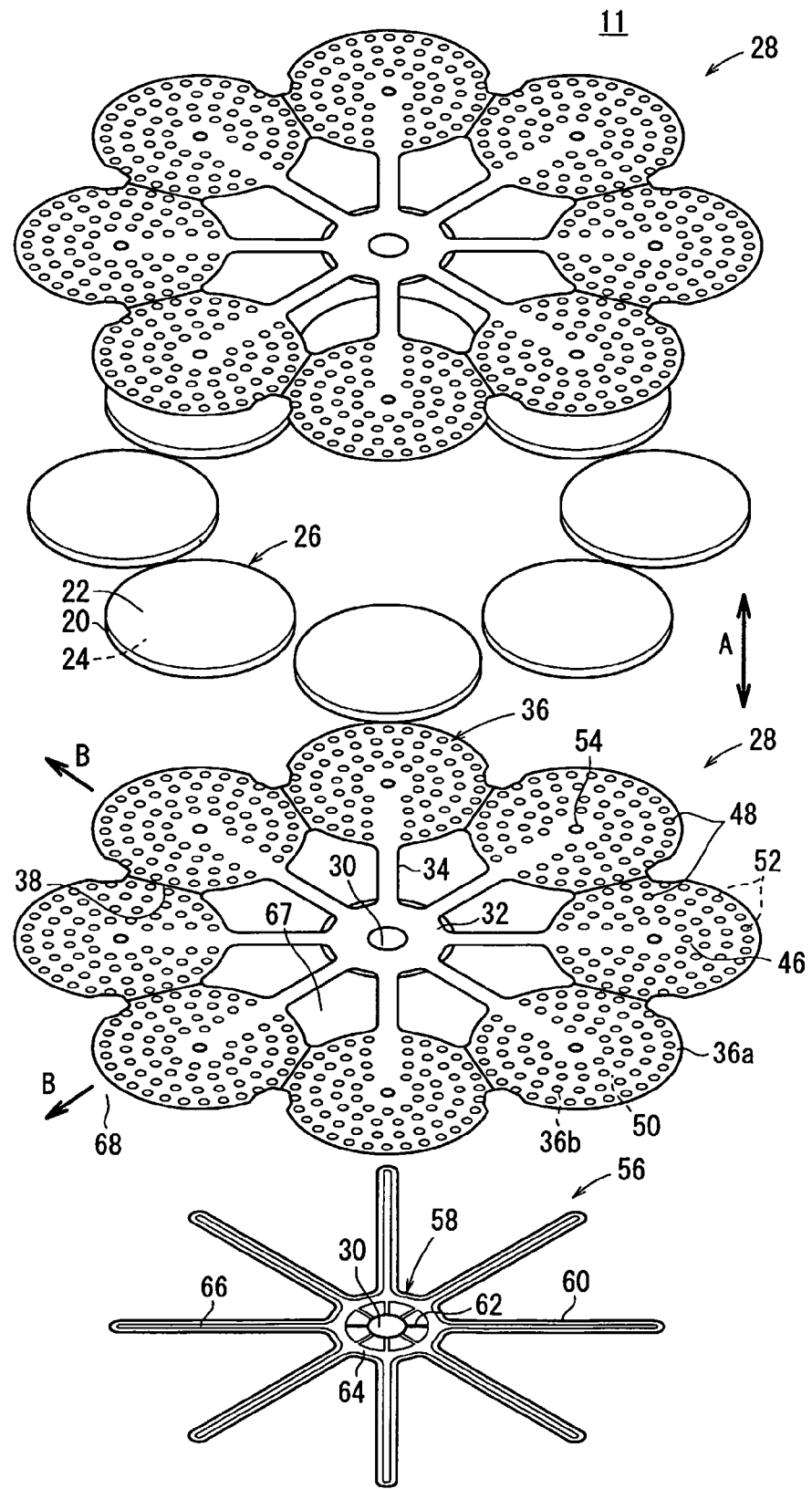
FIG. 3 is an exploded perspective view showing the fuel cell of the fuel cell stack.
Figure 4:
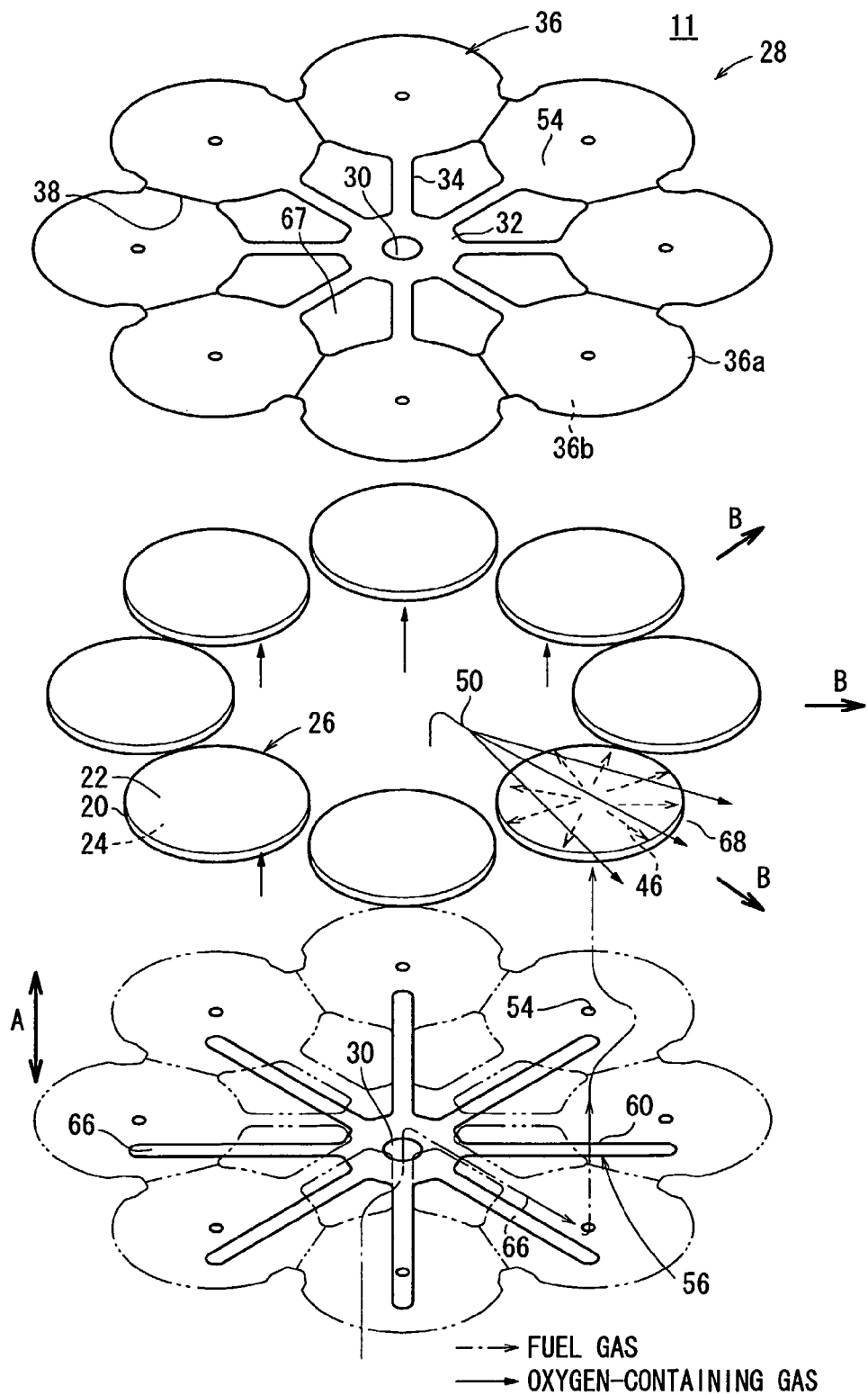
FIG. 4 is a partial exploded perspective view showing gas flows in the fuel cell.

The fuel cell 11 is a solid oxide fuel cell (SOFC). As shown in FIGS. 3 and 4, the fuel cell 11 includes electrolyte electrode assemblies 26. Each of the electrolyte electrode assemblies 26 includes a cathode 22, an anode 24, and an electrolyte (electrolyte plate) 20 interposed between the cathode 22 and the anode 24. For example, the electrolyte 20 is made of ion-conductive solid oxide such as stabilized zirconia. The electrolyte electrode assembly 26 has a circular disk shape. A barrier layer (not shown) is provided at least at the inner circumferential edge of the electrolyte electrode assembly 26 for preventing the entry of the oxygen-containing gas.

A plurality of, e.g., eight electrolyte electrode assemblies 26 are interposed between a pair of separators 28 to form the fuel cell 11. The eight electrolyte electrode assemblies 26 are concentric with a fuel gas supply passage 30 extending through the center of the separators 28.

In FIG. 3, for example, each of the separators 28 comprises a metal plate of, e.g., stainless alloy or a carbon plate. The separator 28 has a first small diameter end portion 32. The fuel gas supply passage 30 extends through the center of the first small diameter end portion 32. The first small diameter end portion 32 is integral with circular disks 36 each having a relatively large diameter through a plurality of first bridges 34. The first bridges 34 extend radially outwardly from the first small diameter end portion 32 at equal angles (intervals). The circular disk 36 and the electrolyte electrode assembly 26 have substantially the same size. The adjacent circular disks 36 are separated from each other by slits 38.

Each of the circular disks 36 has first protrusions 48 on its surface 36a which contacts the anode 24. The first protrusions 48 form a fuel gas channel 46 for supplying a fuel gas along an electrode surface of the anode 24. Each of the circular disks 36 has second protrusions 52 on its surface 36b which contacts the cathode 22. The second protrusions 52 form an oxygen-containing gas channel 50 for supplying the oxygen-containing gas along an electrode surface of the cathode 22 (see FIG. 5).

Figure 6:
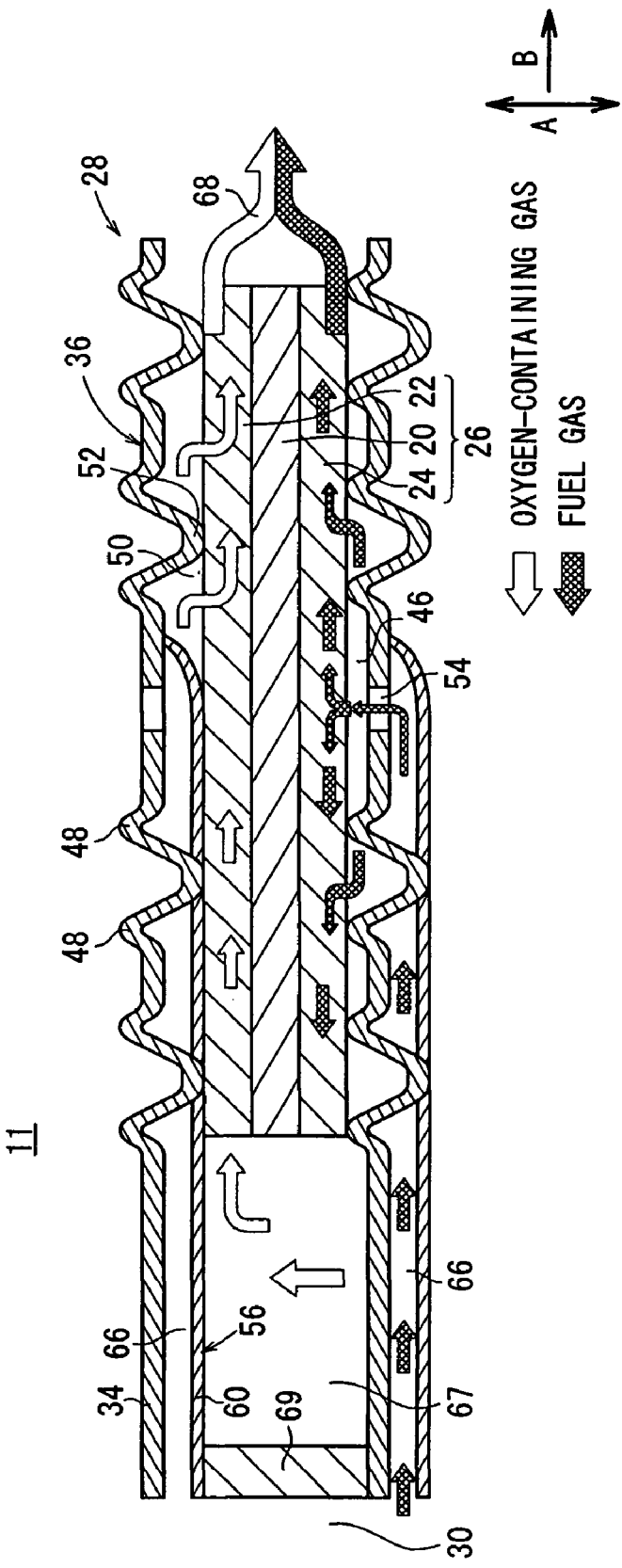
FIG. 6 is a cross sectional view schematically showing operation of the fuel cell.

As shown in FIG. 6, the first protrusions 48 and the second protrusions 52 protrude away from each other. The first protrusions 48 are ring shaped protrusions, and the second protrusions 52 are mountain shaped protrusions. The second protrusions (mountain shaped protrusions) 52 are surrounded by the first protrusions (ring shaped protrusions) 48.

Figure 5:
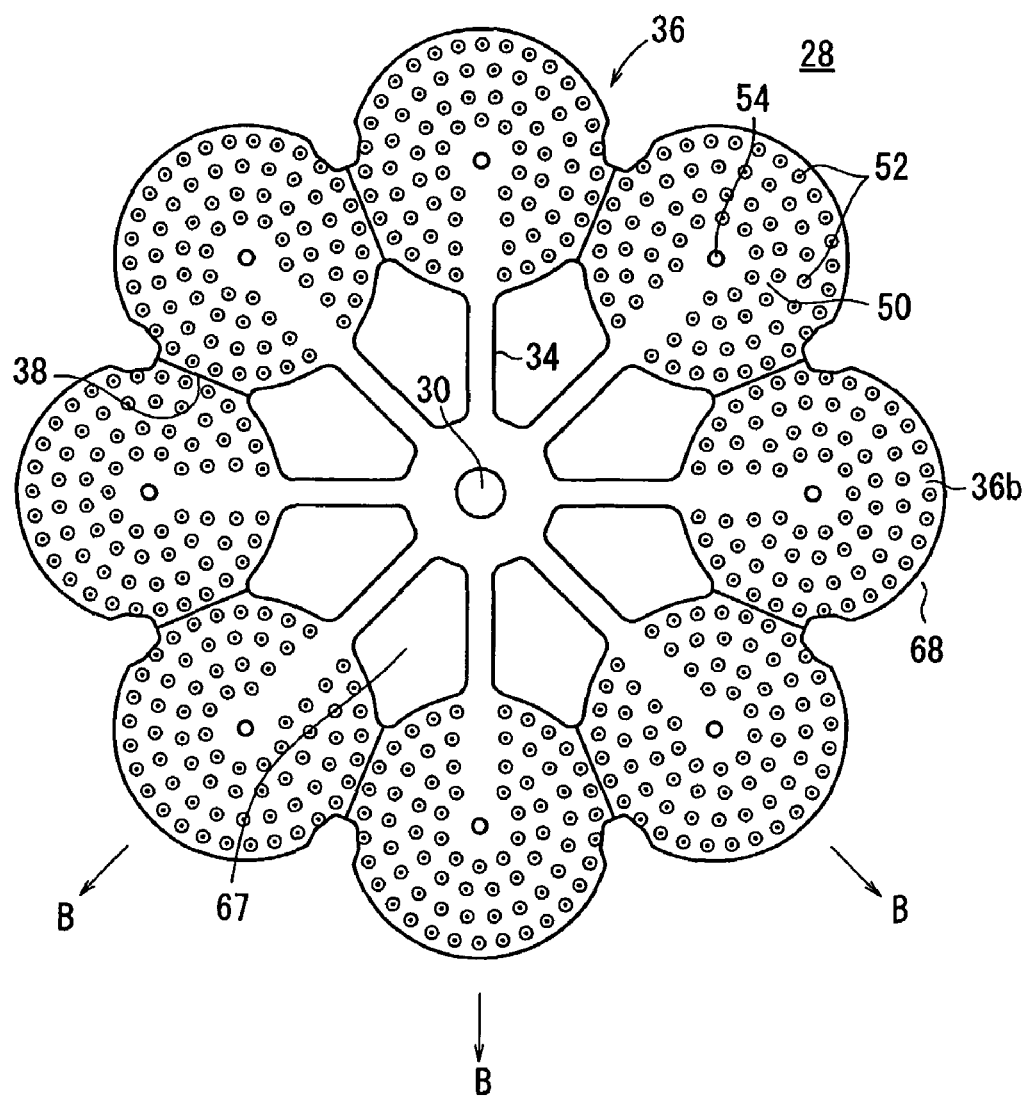
FIG. 5 is a front view showing a separator of the fuel cell.

As shown in FIGS. 3 to 5, a fuel gas inlet 54 is provided in each of the circular disks 36. The fuel gas flows through the fuel gas inlet 54 into the fuel gas channel 46. The position of the fuel gas inlet 54 is determined so that the fuel gas can be distributed uniformly. For example, the fuel gas inlet 54 is provided at the center of the circular disk 36.

A channel member 56 is fixed to the separator 28 by brazing or laser welding on a surface facing the cathode 22. As shown in FIG. 3, the channel member 56 includes a second small diameter end portion 58. The fuel gas supply passage 30 extends through the center of the second small diameter end portion 58. Eight second bridges 60 extend radially from the second small diameter end portion 58. Each of the second bridges 60 is fixed to the separator 28, from the first bridge 34 to the fuel gas inlet 54 of the circular disk 36.

A plurality of slits 62 are formed on the second small diameter end portion 58 of the channel member 56. The slits 62 are formed radially on a surface of the second small diameter end portion 58 which is joined to the separator 28. The slits 62 are connected to the fuel gas supply passage 30. Further, the slits 62 are connected to a recess 64 formed in the outer circumferential region of the second small diameter end portion 58. The recess 64 prevents the flow of the brazing material, and achieves the uniform flow of the fuel gas. A fuel gas supply channel 66 is formed between the first and second bridges 34, 60. The fuel gas supply channel 66 is connected to the fuel gas channel 46 through the slits 62 and the recess 64.

As shown in FIG. 6, the oxygen-containing gas channel 50 is connected to an oxygen-containing gas supply unit 67. The oxygen-containing gas is supplied in the direction indicated by the arrow B through the space between the inner circumferential edge of the electrolyte electrode assembly 26 and the inner circumferential edge of the circular disk 36. The oxygen-containing gas supply unit 67 is formed by spaces between the inner sides of the respective circular disks 36 and the first bridges 34, and extends in the stacking direction.

Insulating seals 69 for sealing the fuel gas supply passage 30 is provided between the separators 28. For example, the insulating seals 69 are made of mica material, or ceramic material. An exhaust gas channel 68 extends through the fuel cells 11 in the stacking direction outside the respective circular disks 36.

As shown in FIGS. 1 and 2, the fuel cell stack 12 includes a plurality of fuel cells 11 stacked together, and end plates 70a, 70b provided at opposite ends in the stacking direction. The end plate 70a has a substantially circular disk shape. A ring shaped portion 72 is formed in the outer circumferential region of the end plate 70a. The ring shaped portion 72 axially protrudes from the end plate 70a. A groove 74 is formed around the ring shaped portion 72. A columnar protrusion 76 is provided at the center of the ring shaped portion 72. The columnar protrusion 76 and the ring shaped portion 72 protrude from the end plate 70a in the same direction. A hole 78 is formed at the center of the protrusion 76.

Figure 7:
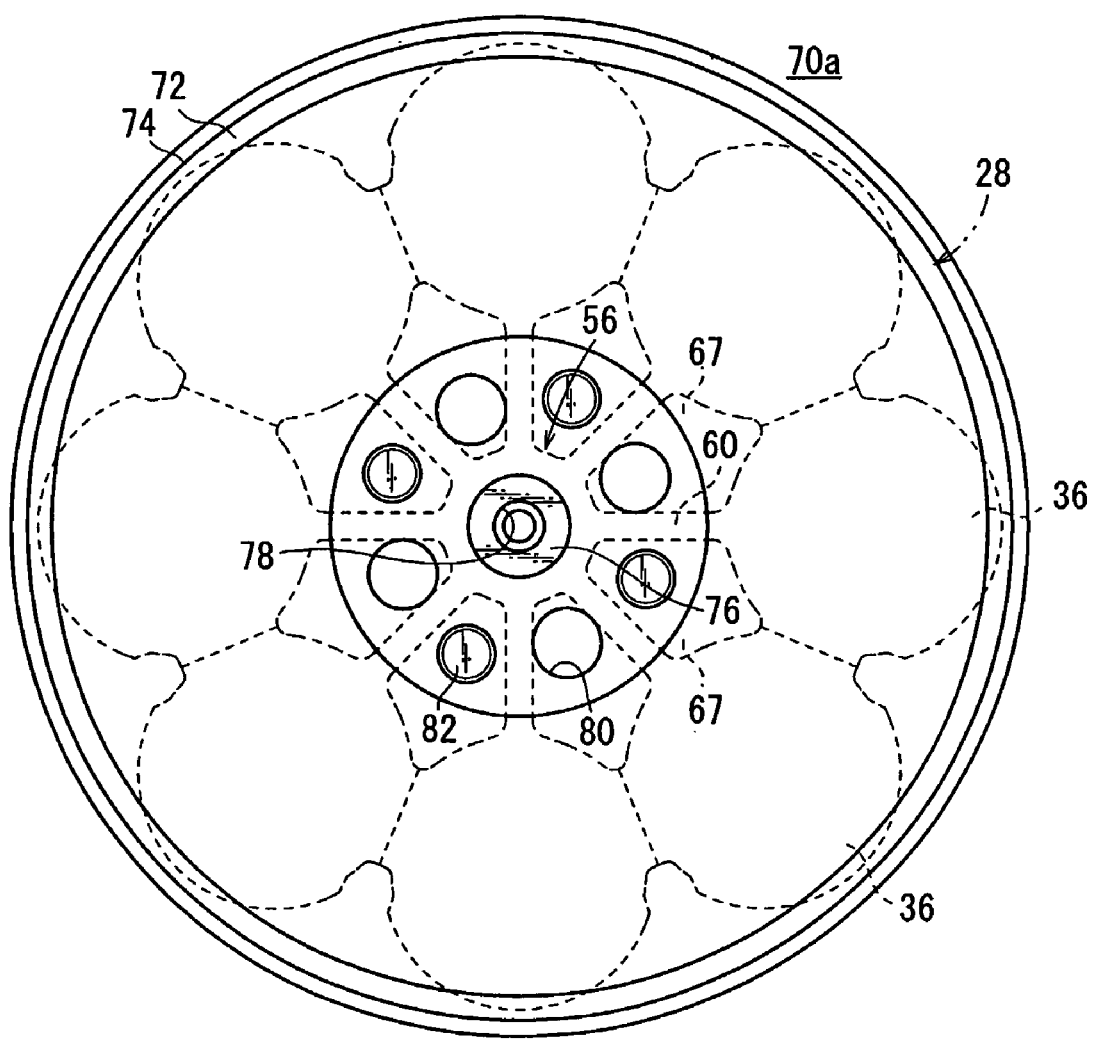
FIG. 7 is a front view showing an end plate of the fuel cell stack.

In the end plate 70a, holes 80 and screw holes 82 are formed alternately along a virtual circle around the protrusion 76. The holes 80 and the screw holes 82 are spaced from each other by predetermined intervals (angles). As shown in FIG. 7, the holes 80 and the screw holes 82 are provided at positions corresponding to respective spaces of the oxygen-containing gas supply unit 67 formed between the first and second bridges 34, 60.

As shown in FIG. 1, the diameter of the end plate 70b is larger than the diameter of the end plate 70a. A thick section 84 is provided along the outer end of the end plate 70b.

The casing 18 includes a first case unit 86a containing the load applying mechanism 21 and a second case unit 86b containing the fuel cell stack 12 and the fluid unit 19. For example, the first and second case units 86*a*, 86*b* are made of nickel-based heat resistant alloy.

A ring-shaped insulating member 87*a* is interposed between the end plate 70*b* and the second case unit 86*b*, and an insulating member 122 as described later is interposed between the end plate 70*b* and the first case unit 86*a*. The first case unit 86*a* and the second case unit 86*b* are tightened together by screws 88 and nuts 90. The screws 88 and the nuts 90 are electrically insulated from the second case unit 86*b* by cylindrical or ring-shaped insulating members 87*b*, 87*c*.

The end plate 70*b* is an electrically conductive plate. The end plate 70*b* functions as a gas barrier for preventing entry of the hot exhaust gas or the hot air from the fluid unit 19 and the fuel cell stack 12 into the load applying mechanism 21.

A first current collecting terminal 91*a* is provided at the thick section 84 of the end plate 70*b*. The first current collecting terminal 91*a* is electrically connected to one pole of the fuel cell stack 12. A second current collecting terminal 91*b* is attached to the second case unit 86*b*. The second current collecting terminal 91*b* is electrically connected to the other pole of the fuel cell stack 12 through the end plate 70*a* and the heat exchanger 14. The first and second current collecting terminals 91*a*, 91*b* are connected to a load (not shown) such as a motor.

An end of a cylindrical wall plate 92 is joined to the second case unit 86*b*, and a head plate 94 is fixed to the other end of the wall plate 92. The fluid unit 19 is provided symmetrically with respect to the central axis of the fuel cell stack 12. Specially, the substantially cylindrical reformer 16 is provided coaxially inside the substantially ring shaped heat exchanger 14. The heat exchanger 14 and the reformer 16 are fixed to a wall plate 96, and the wall plate 96 is fixed to the groove 74 around the end plate 70*a*. A chamber 98 is formed between the end plate 70*a* and the wall plate 96.

A fuel gas supply pipe 100 and a reformed gas supply pipe 102 are connected to the reformer 16. The fuel gas supply pipe 100 extends to the outside from the head plate 94. The reformed gas supply pipe 102 is inserted into the hole 78 of the end plate 70*a*, and connected to the fuel gas supply passage 30.

An air supply pipe 104 and an exhaust gas pipe 106 are connected to the head plate 94. A channel 108 extending from the air supply pipe 104 to the chamber 98 through the heat exchanger 14 and a channel 110 extending from the exhaust gas channel 68 of the fuel cell stack 12 to the exhaust gas pipe 106 through the heat exchanger 14 are provided in the casing 18.

The load applying mechanism 21 is disposed in a chamber 111 formed between the first case unit 86*a* and the end plate 70*b*. The load applying mechanism 21 includes a first tightening unit 112*a* for applying a first tightening load T1 to a region around (near) the fuel gas supply passage 30 and a second tightening unit 112*b* for applying a second tightening load T2 to the electrolyte electrode assemblies 26. The second tightening load T2 is smaller than the first tightening load T1 (T1>T2).

Figure 8:
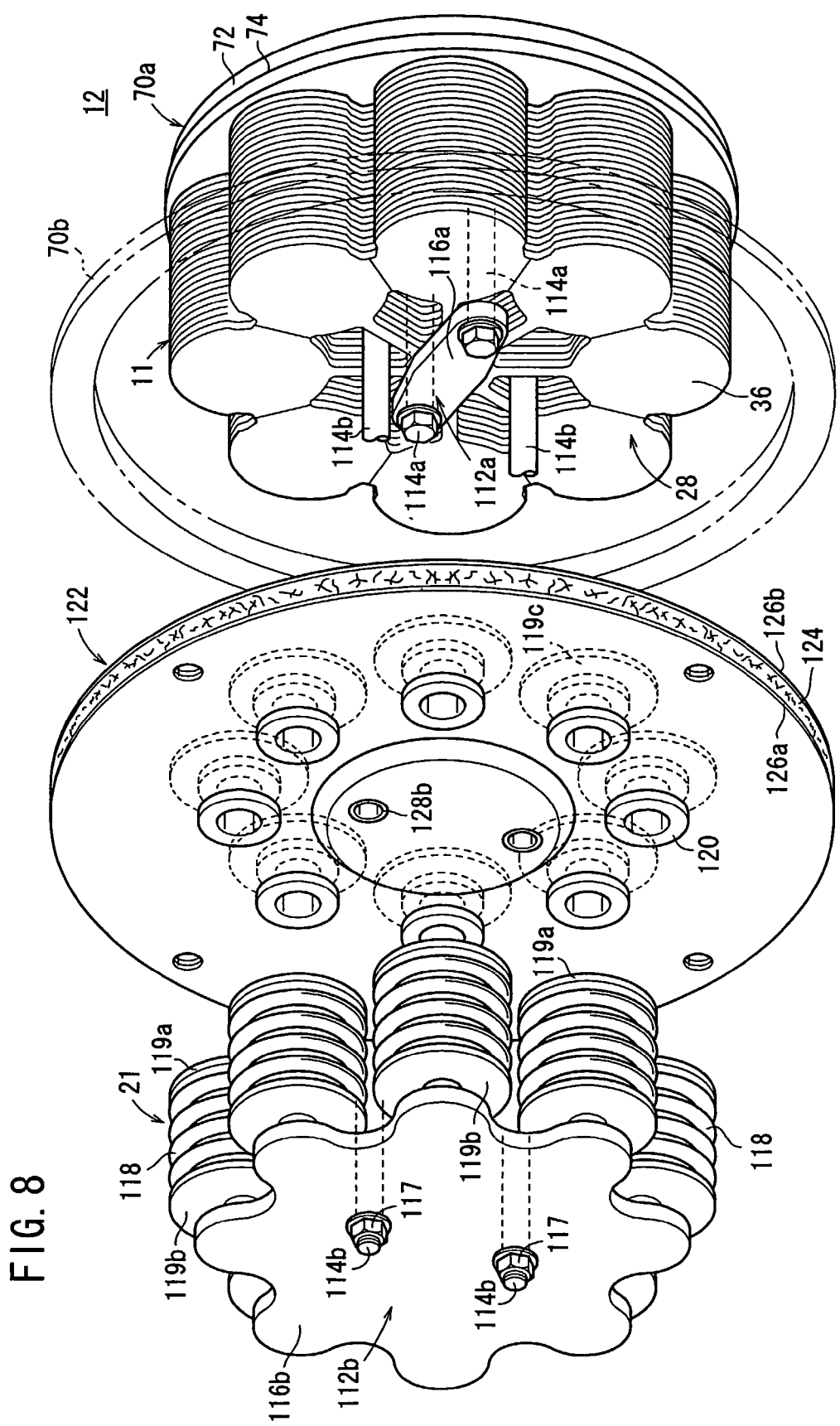
FIG. 8 is a partial exploded perspective view showing a load applying mechanism of the fuel cell system.
Figure 9:
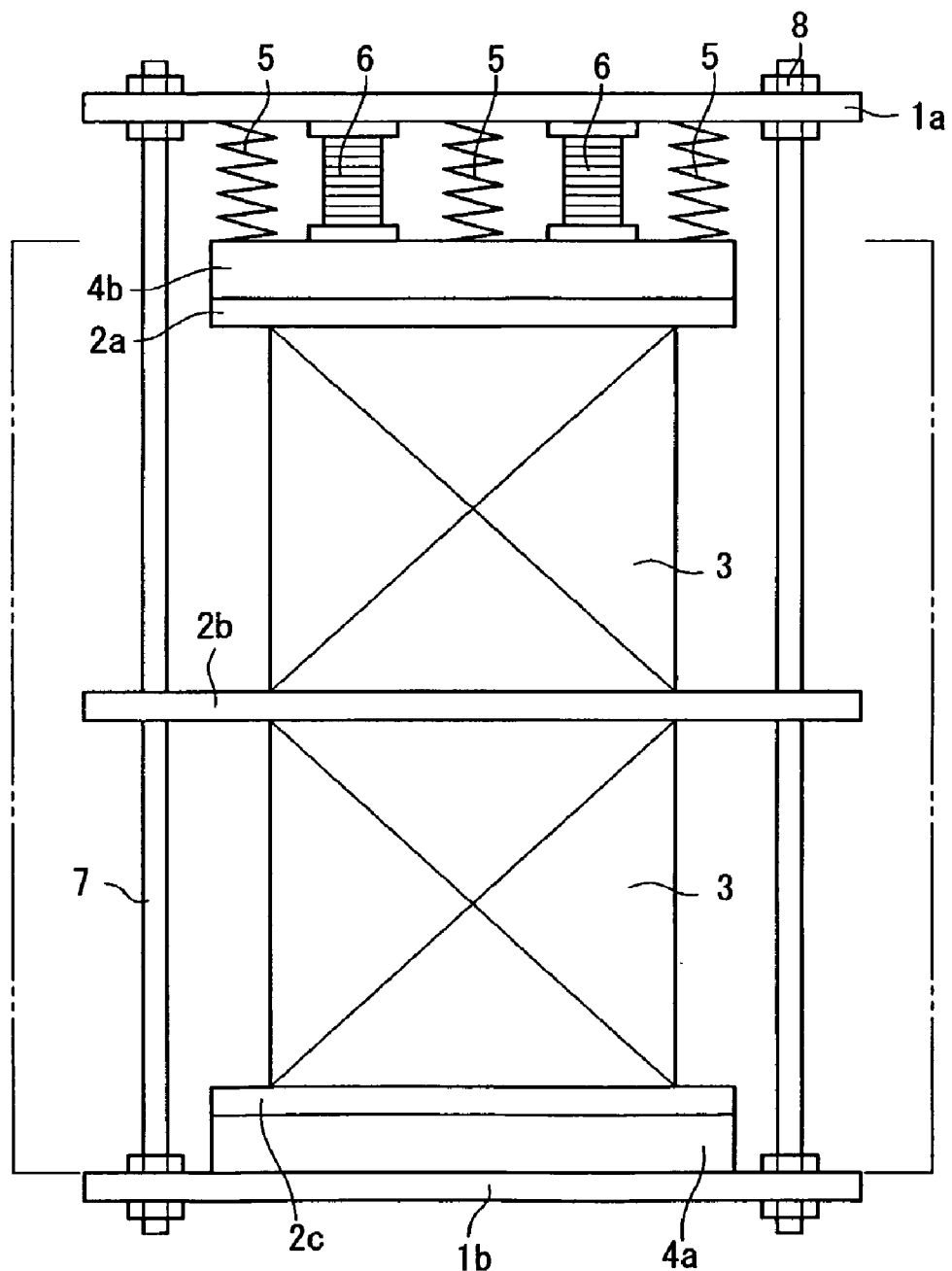
FIG. 9 is a view schematically showing structure of a fuel cell according to a conventional technique.

As shown in FIGS. 1, 2, and 8, the first tightening unit 112*a* includes short first tightening bolts 114*a* screwed into the screw holes 82 provided along one diagonal line of the end plate 70*a*. The first tightening bolts 114*a* extend in the stacking direction of the fuel cells 11, and engage a first presser plate 116*a*. The first tightening bolts 114*a* are provided in the oxygen-containing gas supply unit 67 in the separators 28. The first presser plate 116*a* is a narrow plate, and engages the central position of the separator 28 to cover an insulating seal 69 of the fuel gas supply passage 30.

The second tightening unit 112*b* includes long second tightening bolts 114*b* screwed into the screw holes 82 provided along the other diagonal line of the end plate 70*a*. Ends of the second tightening bolts 114*b* extend through a second presser plate 116*b* having a curved outer section. Nuts 117 are fitted to the ends of the second tightening bolts 114*b*. The second tightening bolts 114*b* and the nuts 117 are electrically insulated from the second presser plate 116*b* through an insulating member 87*d*. The second tightening bolts 114*b* are provided in the oxygen-containing gas supply unit 67 in the separators 28.

The thickness of the second presser plate 116*b* in the stacking direction is small in comparison with the first presser plate 116*a*. Metal springs (metal elastic members) 118 and spring seats 119*a*, 119*b* are provided in respective circular portions of the second presser plate 116*b*, at positions corresponding to the electrolyte electrode assemblies 26 on the circular disks 36 of the fuel cell 11. Spring seats 119*c* are provided on the end plate 70*b*, at positions corresponding to the positions of the spring seats 119*a*. Sleeve members 120 are inserted between the spring seats 119*a*, 119*c*. A heat insulating member (heat barrier layer) 122 is positioned by inserting the sleeve members 120 and the second tightening bolts 114*b* into the heat insulating member 122.

The heat insulating member 122 is formed by sandwiching heat insulating material 124 between a pair of metal plates 126*a*, 126*b*. For example, the heat insulating material 124 is ceramics-based heat insulating material such as alumina, silica, or alumina-silica fiber.

The heat insulating member 122 has a substantially circular disk shape. The thickness H1 in the central region of the heat insulating member 122 is smaller than the thickness H2 of the outer region of the heat insulating member 122. The sleeve members 120 are inserted into the thick outer region using seals 128*a*, and the second tightening bolts 114*b* are inserted into the thin central region using seals 128*b*. The seals 128*a*, 128*b* are made of ceramics material such as graphite or silicon carbide.

Tube members 130*a*, 130*b* are connected to the first case unit 86*a* such that an air flow in the chamber 111 is generated through the tube members 130*a*, 130*b*.

Operation of the fuel cell system 10 will be described below.

As shown in FIG. 3, in assembling the fuel cell system 10, firstly, the separator 28 is joined to the channel member 56 on its surface facing the cathode 22. Therefore, the fuel gas supply channel 66 connected to the fuel gas supply passage 30 is formed between the separator 28 and the channel member 56. The fuel gas supply channel 66 is connected to the fuel gas channel 46 through the fuel gas inlet 54 (see FIG. 6). The ring shaped insulating seal 69 is provided on each of the separators 28 around the fuel gas supply passage 30.

In this manner, the separator 28 is fabricated. Eight electrolyte electrode assemblies 26 are interposed between the separators 28 to form the fuel cell 11. As shown in FIGS. 3 and 4, the electrolyte electrode assemblies 26 are interposed between the surface 36*a* of one separator 28 and the surface 36*b* of the other separator 28. The fuel gas inlet 54 of the circular disk 36 is positioned at the center in each of the anodes 24.

A plurality of the fuel cells 11 are stacked in the direction indicated by the arrow A, and the end plates 70*a*, 70*b* are provided at opposite ends in the stacking direction. As shown in FIGS. 1 and 8, the first presser plate 116*a* of the first tightening unit 112*a* is provided at the center of the fuel cell 11. The first presser plate 116*a* has a minimum size necessary for receiving the load in the stacking direction.

In this state, the short first tightening bolts 114a are inserted through the first presser plate 116a and the end plate 70b toward the end plate 70a. Tip ends of the first tightening bolts 114a are screwed into, and fitted to the screw holes 82 formed along one of the diagonal lines of the end plate 70a. The heads of the first tightening bolts 114a engage the first presser plate 116a. The first tightening bolts 114a are screwed into the screw holes 82 to adjust the surface pressure of the first presser plate 116a. In this manner, in the fuel cell stack 12, the first tightening load T1 is applied to the seal region near the fuel gas supply passage 30.

Then, the spring seats 119c are overlapped in the stacking direction with the electrolyte electrode assemblies 26 at positions of the circular disks 36 such that the end plate 70b is interposed between the electrolyte electrode assemblies 26 and the spring seats 119c. The heat insulating member 122 is provided between the spring seats 119c and the spring seats 119a. The sleeve members 120 are interposed between the insulating member 122 and the spring seats 119a. Further, the metal springs 118 are provided between the spring seats 119a and the spring seats 119b. The second presser plate 116b of the second tightening unit 112b engages the spring seats 119b.

Then, the long second tightening bolts 114b are inserted through the second presser plate 116b and the end plate 70b toward the end plate 70a. The tip end of the second tightening bolts 114b are screwed into, and fitted to the screw holes 82 formed along the other diagonal line of the end plate 70a. The nuts 117 are fitted to the heads of the second tightening bolts 114b by the insulating member 87d. Therefore, by adjusting the state of the screw engagement between the nuts 117 and the second tightening bolts 114b, the second tightening load T2 is applied to the electrolyte electrode assemblies 26 by the elastic force of the respective metal springs 118.

The end plate 70b and the heat insulating member 122 of the fuel cell stack 12 are sandwiched between the first and second case units 86a, 86b of the casing 18. The insulating member 87a is provided between the end plate 70b and the second case unit 86b. The insulating members 87b, 87c are provided at predetermined positions, and the first and second case units 86a, 86b are fixed by the screws 88 and the nuts 90.

The fluid unit 19 is mounted in the second case unit 86b. The wall plate 96 of the fluid unit 19 is attached to the groove 74 around the end plate 70a. Thus, the chamber 98 is formed between the end plate 70a and the wall plate 96.

Next, in the fuel cell system 10, as shown in FIG. 1, a fuel (methane, ethane, propane, or the like) and, as necessary, water are supplied from the fuel gas supply pipe 100, and an oxygen-containing gas (hereinafter referred to as "air") is supplied from the air supply pipe 104.

The fuel is reformed when it passes through the reformer 16 to produce a fuel gas (hydrogen-containing gas). The fuel gas is supplied to the fuel gas supply passage 30 of the fuel cell stack 12. The fuel gas moves in the stacking direction indicated by the arrow A, and flows into the fuel gas supply channel 66 through the slit 62 in the separator 28 of each fuel cell 11 (see FIG. 6).

The fuel gas flows along the fuel gas supply channel 66 between the first and second bridges 34, 60, and flows into the fuel gas channel 46 from the fuel gas inlets 54 of the circular disks 36. The fuel gas inlets 54 are formed at positions corresponding to central regions of the anodes 24 of the electrolyte electrode assemblies 26. Thus, the fuel gas is supplied from the fuel gas inlets 54 to the substantially central positions of the anodes 24, and flows outwardly from the central regions of the anodes 24 along the fuel gas channel 46.

As shown in FIG. 1, air from the air supply pipe 104 flows through the channel 108 of the heat exchanger 14, and temporarily flows into the chamber 98. The air flows through the holes 80 connected to the chamber 98, and is supplied to the oxygen-containing gas supply unit 67 provided at substantially the center of the fuel cells 11. At this time, in the heat exchanger 14, as described later, since the exhaust gas discharged to the exhaust gas channel 68 flows through the channel 110, heat exchange between the air before supplied to the fuel cells 11 and the exhaust gas is performed. Therefore, the air is heated to a desired fuel cell operating temperature beforehand.

The oxygen-containing gas supplied to the oxygen-containing gas supply unit 67 flows into the space between the inner circumferential edge of the electrolyte electrode assembly 26 and the inner circumferential edge of the circular disk 36 in the direction indicated by the arrow B, and flows toward the oxygen-containing gas channel 50. As shown in FIG. 6, in the oxygen-containing gas channel 50, the air flows from the inner circumferential edge (central region of the separator 28) to the outer circumferential edge (outer region of the separator 28) of, i.e., from one end to the other end of the outer circumferential region of the cathode 22 of the electrolyte electrode assembly 26.

Thus, in the electrolyte electrode assembly 26, the fuel gas flows from the central region to the outer circumferential region of the anode 24, and the air flows in one direction indicted by the arrow B on the electrode surface of the cathode 22. At this time, oxygen ions flow through the electrolyte 20 toward the anode 24 for generating electricity by electrochemical reactions.

The exhaust gas discharged to the outside of the respective electrolyte electrode assemblies 26 flows through the exhaust gas channel 68 in the stacking direction. When the exhaust gas flows through the channel 110 of the heat exchanger 14, heat exchange between the exhaust gas and the air is carried out. Then, the exhaust gas is discharged into the exhaust gas pipe 106.

In the embodiment of the present invention, the fluid unit 19 is provided on one side of the fuel cell stack 12, and the load applying mechanism 21 is provided on the other side of the fuel cell stack 12. The end plate 70b and the heat insulating member 122 are interposed between the fuel cell stack 12 and the load applying mechanism 21. Therefore, the end plate 70b prevents entry of the hot exhaust gas from the fluid unit 19 and the fuel cell stack 12 into the load applying mechanism 21, and the heat insulating member 122 suitably prevents heat conduction (transmission) from the fuel cell stack 12 to the load applying mechanism 21.

Thus, with the simple structure, the load applying mechanism 21 is not exposed to the hot gas. The load applying mechanism 21 is not heated to high temperature by heat conduction. Improvement in the durability of the load applying mechanism 21 is achieved suitably. Further, the load applying mechanism 21 uses the metal springs 118 as elastic members. The metal springs 118 are not heated to the temperature which causes degradation of the spring reaction force. Therefore, for example, in comparison with the case in which ceramics springs are used, or bellows are used in combination, the structure is simplified economically, and improvement in the durability and reliability is achieved advantageously.

Further, the heat insulating member 122 is formed by sandwiching the heat insulating material 124 such as ceramics insulating material between metal plates 126a, 126b. Thus, damage of the heat insulating member 124 due to the load in the stacking direction is prevented, and the structure is simplified. The central region of the insulating member 122 is thin (thickness H1), and the outer region of the insulating member 122 is thick (thickness H2). This is because since the oxygen-containing gas is supplied from the inside to the outside of the fuel cell stack 12, the temperature inside the fuel cell stack 12 tends to be lower than the temperature outside the fuel cell stack 12.

Further, in the embodiment of the present invention, the load applying mechanism 21 is provided in the chamber 111, and the tube members 130a, 130b are connected to the chamber 111. Therefore, when the air is forcibly supplied into the chamber 111 from the coolant inlet, e.g., the tube member 130a, an air flow from the tube member 130a to the tube member 130b through the chamber 111 is generated. Thus, in particular, it is possible to cool the metal springs 118 further reliably.

INDUSTRIAL APPLICABILITY

According to the present invention, since the heat barrier layer is provided between the fuel cell stack and the load applying mechanism, the load applying mechanism is not exposed to the hot gas or the hot air from the fuel cell stack. With the simple structure, improvement in the durability of the load applying mechanism is achieved suitably.

Further, the load applying mechanism includes metal elastic members such as metal springs for applying a load to the fuel cell stack in the stacking direction. Therefore, for example, in comparison with the case of using ceramics springs, the load applying mechanism has an economical structure. Improvement in the durability and reliability of the load applying mechanism is achieved suitably.

The invention claimed is:

1. A fuel cell system comprising:

a fuel cell stack formed by stacking a plurality of fuel cells in a stacking direction, said fuel cells each including an electrolyte electrode assembly and separators sandwiching said electrolyte electrode assembly, said electrolyte electrode assembly including an anode, a cathodes, and an electrolyte interposed between said anode and said cathode;

a fluid unit provided on one side of said fuel cell stack, said fluid unit including a heat exchanger for heating an oxygen-containing gas to be supplied to said fuel cell stack, and a reformer for reforming a fuel to produce a fuel gas;

a load applying mechanism provided on the other side of said fuel cell stack for applying a tightening load to said fuel cell stack in the stacking direction, said load applying mechanism includes a metal elastic member for applying the load to said fuel cell stack in the stacking direction and said load applying mechanism includes a first tightening unit for applying a load to a central position of a separator of said fuel cell stack in the stacking direction and a second tightening unit for applying a load to said electrolyte electrode assembly in the stacking direction through only said metal elastic member, and the load applied by said second tightening unit is smaller than the load applied by said first tightening unit; and a casing containing said fuel cell stack, said fluid unit, and said load applying mechanism, wherein said casing includes a first case unit containing said second tightening unit and a second case unit containing said fuel cell stack, said fluid unit, and said first tightening unit;

wherein a heat barrier layer is sandwiched between said first case unit and said second case unit for limiting heat transmission from said fuel cell stack to said second tightening unit.

2. A fuel cell system according to claim 1, wherein a coolant inlet for allowing entry of a coolant for cooling said metal elastic member is formed in said first case unit.

3. A fuel cell system according to claim 2, wherein an inlet tube member as said coolant inlet and an outlet tube member are provided at said first case unit for generating a flow of the coolant.

4. A fuel cell system according to claim 1, wherein said heat barrier layer is formed by sandwiching heat insulating material between a pair of metal plates.

5. A fuel cell system according to claim 3, wherein said heat barrier layer has a circular disk shape; and the central region of said heat barrier layer is thinner than the outer region of said heat barrier layer.

6. A fuel cell system according to claim 1, wherein said metal elastic member is a metal spring.

* * * * *